United States Patent [19]

Crits

[11] Patent Number: 4,472,282

[45] Date of Patent: Sep. 18, 1984

[54] MIXED BED POLISHING PROCESS

[75] Inventor: George J. Crits, Havertown, Pa.

[73] Assignee: Crane Co., New York, N.Y.

[21] Appl. No.: 327,842

[22] Filed: Dec. 7, 1981

[51] Int. Cl.³ .............................................. B01J 49/00
[52] U.S. Cl. .................................... 210/675; 210/679; 210/686; 521/26
[58] Field of Search ............... 210/675, 679, 686, 274; 521/26

[56] References Cited

U.S. PATENT DOCUMENTS

| | | | |
|---|---|---|---|
| 2,666,741 | 1/1954 | McMullen | 210/686 |
| 3,455,819 | 7/1969 | Crits | 210/274 |
| 3,583,908 | 6/1971 | Crits | 210/686 |
| 4,191,644 | 3/1980 | Lembo et al. | 210/675 |
| 4,264,439 | 4/1981 | Lefevre et al. | 210/675 |

*Primary Examiner*—Ivars Cintins

*Attorney, Agent, or Firm*—Fitzpatrick, Cella, Harper & Scinto

[57] ABSTRACT

A mixed bed polishing process for regeneration of an exhausted mixed resin bed of cation exchange and anion exchange resins of different densities comprising the steps of scrubbing with air the exhausted mixed resin bed and adding into the mixed resin bed inert resins having a density intermediate the densities of the cation exchange and anion exchange resins. The exhausted mixed resin bed is backwashed to separate into three layers the cation exchange, anion exchange and inert resins. The anion exchange resins are transferred to an anion regenerator; and then, the inert resins are transferred to an inert resin storage tank. The cation exchange resins are regenerated with acid; and then, the anion exchange resins are regenerated with caustic regenerant. The regenerated cation exchange and regenerated anion exchange resins are separately rinsed, and then, mixed together and rinsed.

6 Claims, 1 Drawing Figure

MIXED BED POLISHING PROCESS

BACKGROUND OF THE INVENTION

1. Field of the Invention

This invention relates to a condensate or mixed bed polishing process and, in particular, to a condensate polishing process which utilizes an inert resin to improve both the separation of anion exchange resins from cation exchange resins in a mixed resin bed and chemical regeneration of the anion and cation exchange resins.

2. Description of the Prior Art

In a steam turbine power plant system it is important to provide water for steam generation which has been treated, i.e. substantially freed of unwanted solid content. Condensate polishing processes are employed to treat the water. In conventional processes, untreated water is passed through a service vessel having a mixed resin bed of anion and cation exchange resins which resins act to remove solid content. Periodically, the mixed resin bed becomes exhausted or "spent", requiring regeneration of the resins. Experience has shown that the most efficient procedure for regeneration is to separate the anion from the cation exchange resins, and then, chemically regenerate the anion exchange resins with caustic regenerant and the cation exchange resins with an acid. Backwashing, which is conventionally employed to separate the mixed resin bed, causes a substantial amount of the higher density cation exchange resins to separate out into a layer in the bottom of the service vessel, while a substantial amount of the relatively lighter density anion exchange resins settle into a layer above the layer of cation exchange resins. However, separation is not complete in that some anion exchange resins settle in the cation exchange resin layer, and conversely, some cation exchange resins settle in the anion exchange resin layer. Furthermore, demarcation between the anion and cation exchange resin layers is difficult, if not impossible, to visualize, and more importantly, the area of demarcation is, in reality, a third layer comprised of anion exchange resins with a small, but appreciable, number of entrained cation exchange resins. Accordingly, the more recent prior art references have been directed to processes wherein regeneration of one resin layer does not result in leakage into the other resin layer, while at the same time resins in the demarcation area can be regenerated and reused to reduce the amount of discarded exhausted resin.

SUMMARY OF THE INVENTION

It is an object of this invention to provide a mixed bed polishing process wherein a layer of inert resins is employed.

It is another object of the invention to provide a mixed bed polishing process wherein an inert resin layer is utilized to separate a mixed resin bed into an anion exchange resin layer and a cation exchange resin layer.

It is a further object of this invention to provide a mixed bed polishing process wherein an inert resin layer is utilized to help avoid contamination or leakage of the anion exchange resin layer into the cation exchange resin layer, and vice versa, during regeneration.

It is still another object of this invention to provide a mixed bed polishing process wherein a layer of inert resins can be stored for repeated use.

It is still another object of this invention to provide a mixed bed polishing process wherein the method of employment of the layer of inert resins avoids contamination by acids and caustic regenerants.

It is still a further object of this invention to provide a mixed bed polishing process wherein replenishment, and the expense attendant thereto, of inert resins is substantially reduced.

These and other objects of the present invention are met by a mixed bed polishing process for regeneration of an exhausted mixed resin bed of cation and anion exchange resins wherein each type of resin has different densities. The process comprises the steps of: scrubbing with air the exhausted mixed resin bed and adding into the mixed resin bed inert resins having a density intermediate the densities of the cation and anion exchange resins. The exhausted mixed resin bed is backwashed to separate into three discrete layers the anion, inert and cation resins. The anion exchange resins are transferred to an anion regeneration; and then, the inert resins are transferred to an inert storage tank. The cation exchange resins are regenerated with acid; and then, the anion exchange resins in the anion regenerator are regenerated with caustic regeneration. The regenerant anion exchange resins and regenerated cation exchange resins are rinsed; and, the regenerated anion exchange resins are mixed with the regenerated cation exchange resins.

DESCRIPTION OF THE PREFERRED EMBODIMENTS

Figure 1:
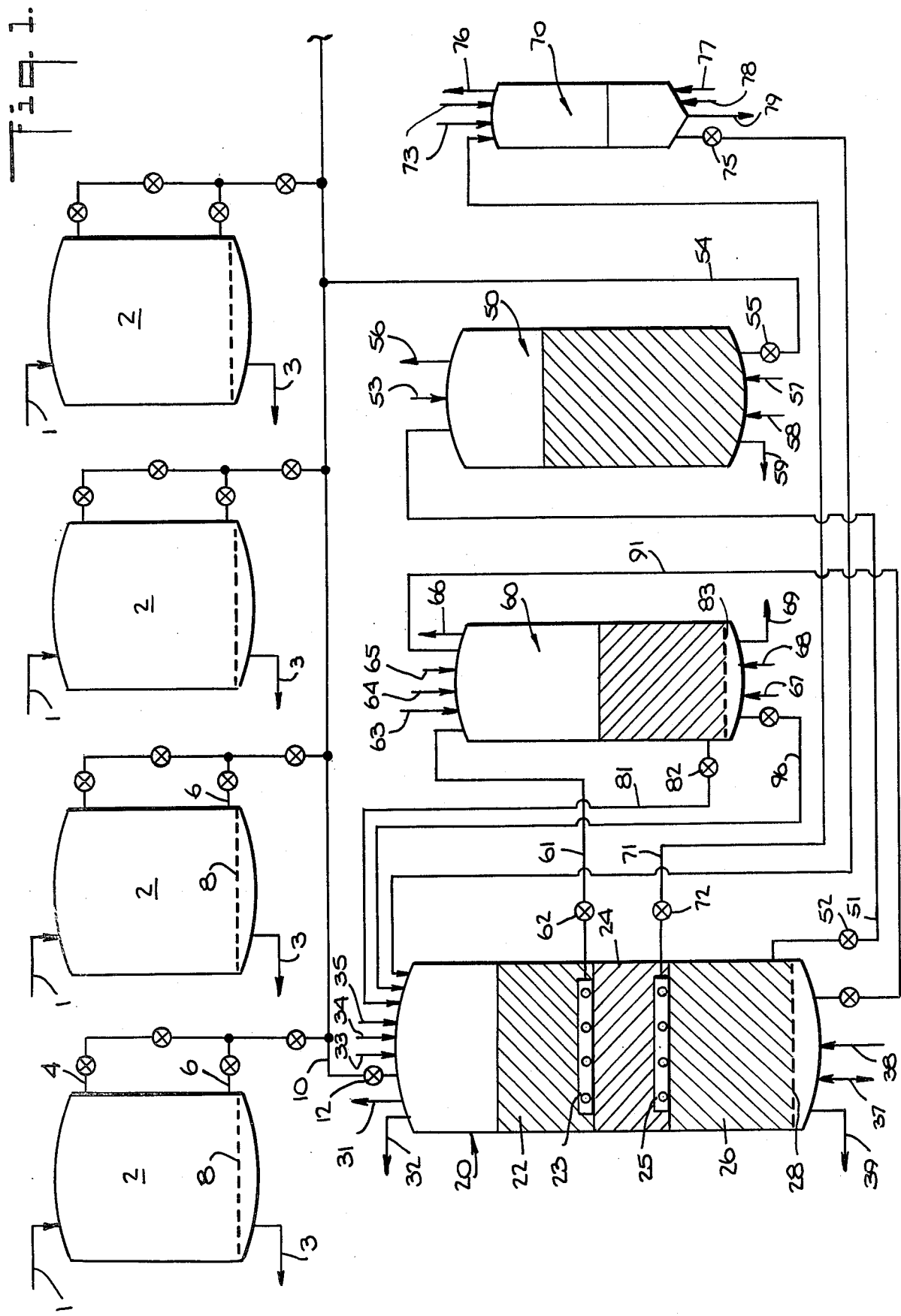
FIG. 1 is a flow diagram of an embodiment of this invention.

Referring to FIG. 1, in a condensate or mixed bed polishing process a plurality of service vessels or mixed bed exchangers, with each exchanger generally represented by reference numeral 2, are operated in parallel with exhaustion sequentially taking an exchanger out of operation. Each exchanger 2 has an on-stream inlet connection 1 and outlet connection 3. Each inlet connection 1 and outlet connection 3 is conventionally known. Some valves are indicated herein, but pumps and other auxiliary devices are omitted; and, each connection may take other forms which will produce the various flows described hereinafter.

Each exchanger 2 has inlet passage 4 and outlet passage 6 for inflow and outflow, respectively, of resins, with the resins being carried on support 8 which may take any conventional form provided it prevents the outflow of resins when treated water is released. Passage 4, 6 connect, via suitable valving to line 10 which is connected to separator and cation regenerator 20. Resin flow from line 10 into cation regenerator 20 is permitted by the opening of valve 12.

Cation regenerator 20 is illustrated with the three resin types; anion exchange resin 22, inert resin 24 and cation exchange resin 26 in their separated or stratified layer condition. Each resin type has a different density, thereby permitting stratification, with cation exchange resin 26 having a higher density than anion exchange resin 22 and with inert resin 24 having a density intermediate the densities of the cation and anion exchange resins. Although various resins may be used, cation exchange resin 26 is preferably of the hydrogen type adapted to be regenerated by a strong acid and ammonia while anion exchange resin 22 is preferably of the hydroxyl type adapted to be regenerated by a caustic soda and ammonia. Inert resin 24 is a copolymer resin which essentially resists interaction with strong acids and caustic regenerants.

Referring to cation regenerator 20, through its top surface there are positioned individual flow passages comprising vent 31, backwash outlet 32, water inlet 33, acid inlet 34 and ammonia inlet 35; and through its bottom surface there are positioned individual flow passages comprising water passage 37, air inlet 38 and drain 39. For the purposes of this invention, each of the above groups of individual flow passages and any group of individual flow passages mentioned hereinafter, may instead be a single passage having suitable valving.

Transfer pipe 51, which is located through a surface of cation regenerator 20 above support 28 which supports cation exchange resin 26 layer in place to permit inflow and outflow of liquids therethrough, permits mixed regenerated resin to move to resin storage tank 50 when valve 52 is in open position. Positioned in the bottom of anion exchange resin 22 layer in cation regenerator 20 is anion resin collector 23 which provides for the transfer of anion exchange resin to anion regenerator 60 through transfer pipe 61 when valve 62 is in open position. Likewise, inert resin collector 25, which is positioned in the bottom of inert resin 24 layer, provides for the transfer of inert resin to inert resin storage tank 70 through transfer pipe 71 when valve 72 is in open position.

Anion regenerator 60, through its top surface, has individual flow passages comprising water inlet 63, caustic inlet 64, ammonia inlet 65 and vent 66; and, through its bottom surface, has water inlet 67, air inlet 68 and drain 69. Positioned through a surface of anion regenerator 60 above support 83 is transfer line 81 which transfers regenerated anion exchange resin into cation regenerator 20 when valve 82 is in open position.

Referring to resin storage tank 50 and inert resin storage tank 70, each tank has through its top surface water inlet 53, 73, and vent 56, 76 and through its bottom surface water inlet 57, 77, air inlet 58, 78 and screened drain 59, 79, respectively.

Resin storage tank 50 through its bottom surface, has transfer line 54 which transfers resin to line 10 when valve 55 is in open position. Likewise, inert resin storage tank 70, through its bottom surface, has transfer line 74 which transfers inert resin 24 to cation regenerator 20 when valve 75 is in open position.

Referring to the operation of the mixed bed polishing process, when mixed resin in an exchanger 2 is exhausted, the exchanger is taken off the line and the exhausted mixed resin is transferred to separator and cation regenerator 20 via outlet passage 6 and line 10 and the opening of valve 12 and valves connecting and contained in passage 6 and line 10.

Regenerated resin from resin storage tank 50 can be transferred to the exchanger 2, in order to place the exchanger back in operational condition, via transfer line 54, line 10 and inlet passage 4 and the opening of valve 55 and the valves connecting and contained within line 10 and passage 4.

The exhausted mixed resins in separator and cation regenerator 20 are scrubbed by air entering through air inlet 38 and via water entering through water inlet 33 or water passage 37 in accordance with the procedure described in U.S. Pat. No. 3,455,819 by George Crits, or by other conventional procedures.

Should the exhausted mixed resin received from exchanger 2 not have any or an insufficient amount of inert resin 24, inert resin from inert resin storage tank 70 is added to the exhausted mixed resin by opening valve 75 and transferring the inert resin through transfer line 74 into separator and cation regenerator 20.

The exhausted mixed resin containing inert resin is backwashed via water entering through water passage 37, and, due to the different densities of each type of resin, the types of resins are separated out into three layers in cation regenerator 20, as shown in FIG. 1, with anion exchange resin 22 layer on top, inert resin 24 layer in the middle and cation exchange resin 26 layer at the bottom.

Once in the separated out condition, anion exchange resin 22 layer is transferred to anion regenerator 60 via anion resin collector 23 and transfer line 61 and the opening of valve 62. Then, inert resin 24 layer is transferred to inert resin storage tank 70 via inert resin collector 25 and transfer line 71 and the opening of valve 72.

Anion exchange resin 22 in anion regenerator 60 is then regenerated by treating the resin with caustic regenerant, such as sodium hydroxide, which enters from caustic inlet 64. The regenerated anion exchange resin is then rinsed of the caustic regenerant by water entering either from water inlet 63 or 67, and the rinsed caustic regenerant is removed via drain 69.

Should the treated anion exchange resin contain an unacceptable amount of entrained cation exchange resin or impurities, it may then be further treated by ammonia in solution, such as ammonium hydroxide. The first ammonia treatment process is disclosed in U.S. Pat. No. 3,385,787 by Crits and Zahn, wherein ammonia in solution is introduced at ammonia inlet 65 and the effluent discarded through drain 69. The ammonia treatment would continue until the desired purification of the anion exchange resin is reached. The second ammonia treatment process disclosed in U.S. Pat. No. 3,583,908 by George Crits, wherein a limited amount of ammonia in suitable concentration is introduced at ammonia inlet 65 and/or ammonia inlet 35 and is permitted via transfer lines, 91 and 96 to flow in a cycle into anion regenerator 60 and into cation regenerator 20. This ammonia treatment process can be continued until an acceptable amount of impurities are removed from the anion exchange resin in the anion regenerator 60 and deposited in the cation exchange resin in cation regenerator 20.

After the regenerated anion exchange resin has reached the desired purification condition, the cation exchange resin 26 in cation regenerator 20 is regenerated by the flow of acid regenerant, such as sulfuric acid, from acid inlet 34. The treated cation exchange resin is then rinsed by water entering either from water inlet 33 or water passage 37. The rinsing water is discharged in the usual fashion. If the regenerated cation exchange resin has not reached the desired purification condition, the resin can then be treated by ammonia hydroxide, which enters cation regenerator 20 from ammonia inlet 35.

After the anion exchange resin and cation exchange resin are regenerated and rinsed, the regenerated anion exchange resin is transferred from anion regenerator 60 to cation regenerator 20, via transfer line 81 with valve 82 in open condition, and mixed with the regenerated cation exchange resin. The mixed resin bed is then rinsed in the usual fashion, and the rinsed mixed resin bed is transferred to resin storage tank 50 via transfer line 51 and the opening of valve 52.

Although certain embodiments have been described and illustrated, modification may be made herein, as by adding, combining or subdividing parts or by substituting equivalents while retaining advantages and benefits of the invention, which itself is defined in the following claims:

I claim:

1. In a mixed bed polishing process for regeneration of an exhausted mixed resin bed consisting of cation exchange resins and anion exchange resins and inert resins wherein each resin has a different density with the density of the inert resins being intermediate the density of the cation exchange resins and anion exchange resins, said process comprising in the following order the steps of:
   (a) scrubbing with air the exhausted mixed resin bed in a cation regenerator;
   (b) separating the exhausted mixed resin bed into three layers in the cation regenerator, wherein a first layer primarily contains the cation exchange resins and an intermediate layer contains the inert resins and a third layer primarily contains the anion exchange resins;
   (c) transferring the third layer to an anion regenerator;
   (d) transferring the intermediate layer to an inert resin storage tank;
   (e) regenerating, separately, the first layer with acid in the cation regenerator and the third layer with caustic regenerant in the anion regenerator;
   (f) rinsing, separately, the first layer in the cation regenerator and the third layer in the anion regenerator;
   (g) mixing together the regenerated and rinsed first and third layers in the cation regenerator; and
   (h) rinsing the mixed first and third layers in the cation regenerator thereby providing a regenerated mixed resin bed.

2. In a mixed bed polishing process for regeneration of an exhausted mixed resin bed consisting of cation exchange resins and anion exchange resins of different densities, said process comprising in the following order the steps of:
   (a) scrubbing with air the exhausted mixed resin bed in a cation regenerator;
   (b) adding into the exhausted mixed resin bed in the cation regenerator inert resins of a density intermediate the densities of the cation exchange resins and the anion exchange resins;
   (c) separating the exhausted mixed resin bed containing the inert resins into three layers in the cation regenerator, wherein a first layer primarily contains the cation exchange resins and an intermediate layer contains the inert resins and a third layer primarily contains the anion exchange resins;
   (d) transferring the third layer to an anion regenerator;
   (e) transferring the intermediate layer to an inert resin storage tank;
   (f) regenerating, separately, the first layer with acid in the cation regenerator and the third layer with caustic regenerant in the anion regenerator;
   (g) rinsing, separately, the first layer in the cation regenerator and the third layer in the anion regenerator;
   (h) mixing together the regenerated and rinsed first and third layers in the cation regenerator; and
   (i) rinsing the mixed first and third layers thereby providing a regenerated mixed resin bed.

3. In a mixed bed polishing process for regeneration of an exhausted mixed resin bed consisting of cation exchange resins and anion exchange resins and inert resins wherein each resin has a different density with the density of the inert resins being intermediate the density of the cation exchange resins and the anion exchange resins, said process comprising in the following order the steps of:
   (a) scrubbing with air the exhausted mixed resin bed in a cation regenerator;
   (b) separating the exhausted mixed resin bed into three layers in the cation regenerator, wherein a first layer primarily contains the cation exchange resins and an intermediate layer contains the inert resins and a third layer primarily contains the anion exchange resins;
   (c) transferring the third layer to an anion regenerator;
   (d) transferring the intermediate layer to an inert resin storage tank;
   (e) regenerating with caustic regenerant the third layer in the anion regenerator;
   (f) rinsing the third layer in the anion regenerator;
   (g) ammoniating, separately, the third layer in the anion regenerator and the first layer in the cation regenerator;
   (h) rinsing, separately, the third layer in the anion regenerator and the first layer in the cation regenerator;
   (i) regenerating with acid the first layer in the cation regenerator;
   (j) rinsing the first layer in the cation regenerator;
   (k) mixing together at least the rinsed, regenerated and ammoniated first and third layers in the cation regenerator; and
   (l) rinsing the mixed first and third layers thereby providing a regenerated mixed resin bed.

4. In a mixed bed polishing process for regeneration of an exhausted mixed resin bed consisting of cation exchange resins and anion exchange resins of different densities, said process comprising in the following order the steps of:
   (a) scrubbing with air the exhausted mixed resin bed in a cation regenerator;
   (b) adding into the exhausted mixed resin bed in the cation regenerator inert resins of a density intermediate the densities of the cation exchange resins and the anion exchange resins;
   (c) separating the exhausted mixed resin bed containing inert resins into three layers in the cation regenerator, wherein a first layer primarily contains the cation exchange resins and an intermediate layer contains the inert resins and a third layer primarily contains the anion exchange resins;
   (d) transferring the third layer to an anion regenerator;
   (e) transferring the intermediate layer to an inert resin storage tank;
   (f) regenerating with caustic regenerant the third layer in the anion regenerator;
   (g) rinsing the third layer in the anion regenerator;
   (h) regenerating with acid the first layer in the cation regenerator;
   (i) rinsing the first layer in the cation regenerator;
   (j) mixing together the rinsed and regenerated first and third layers; and (k) rinsing the mixed first and third layers thereby providing a regenerated mixed resin bed.

5. The process of claim 4, wherein an additional step of ammoniating the first layer in the cation regenerator occurs between steps (i) and (j).

6. The process of claim 5, wherein an additional step of ammoniating the third layer in the anion regenerator occurs between steps (g) and (h).

* * * * *

UNITED STATES PATENT AND TRADEMARK OFFICE
CERTIFICATE OF CORRECTION

PATENT NO.   :   4,472,282
DATED        :   September 18, 1984
INVENTOR(S)  :   GEORGE J. CRITS It is certified that error appears in the above-identified patent and that said Letters Patent is hereby corrected as shown below:

Column 2, line 18, "regeneration" should read --regenerator--;

lines 51-52, "Passage" should read --Passages--.

Signed and Sealed this

Twenty-first Day of May 1985

[SEAL]

Attest:

DONALD J. QUIGG

Attesting Officer   Acting Commissioner of Patents and Trademarks